United States Patent
Naffziger et al.

(10) Patent No.: US 9,671,767 B2
(45) Date of Patent: *Jun. 6, 2017

(54) HYBRID SYSTEM AND METHOD FOR DETERMINING PERFORMANCE LEVELS BASED ON THERMAL CONDITIONS WITHIN A PROCESSOR

(71) Applicant: Advanced Micro Devices, Inc., Sunnyvale, CA (US)

(72) Inventors: Samuel D. Naffziger, Fort Collins, CO (US); Benjamin D. Bates, New Braunfels, TX (US); Praveen K. Dongara, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 597 days.

This patent is subject to a terminal disclaimer.

(21) Appl. No.: 14/277,394

(22) Filed: May 14, 2014

(65) Prior Publication Data

US 2015/0331433 A1   Nov. 19, 2015

(51) Int. Cl.
*G05D 16/00*   (2006.01)
*G05B 15/02*   (2006.01)
(Continued)

(52) U.S. Cl.
CPC ........... *G05B 15/02* (2013.01); *G05D 23/306* (2013.01); *G06F 1/206* (2013.01); *G06F 1/324* (2013.01);
(Continued)

(58) Field of Classification Search
USPC .......................................................... 700/300
See application file for complete search history.

(56) References Cited

U.S. PATENT DOCUMENTS 5,451,892 A * 9/1995 Bailey .................... G06F 1/206
                                                      327/113
6,052,268 A * 4/2000 Thomas ............... H03K 17/082
                                                      361/103
(Continued)

FOREIGN PATENT DOCUMENTS

WO       02/25448 A3       3/2002
WO     2006073899 A2       7/2006
WO     2009114141 A1       9/2009

OTHER PUBLICATIONS

Atienza et al.; "Inducing Thermal-Awareness in Multicore Systems Using Networks-on-Chip", ISVLSI '09 Proceedings of the 2009 IEEE Computer Society Annual Symposium on VLSI, May 13, 2009, pp. 187-192, IEEE Computer Society, Washington D.C., USA.

(Continued)

*Primary Examiner* — Jason Mitchell
(74) *Attorney, Agent, or Firm* — Rory D. Rankin; Meyertons, Hood, Kivlin, Kowert & Goetzel, P.C.

(57) ABSTRACT

A system and method for efficient management of operating modes within an integrated circuit (IC) for optimal power and performance targets. A semiconductor chip includes one or more processing units each of which operates with respective operating parameters. One or more temperature sensors are included to measure a temperature of the one or more processing units during operation. When the measured temperature exceeds a threshold, a power manager on the chip determines a temperature headroom utilizing temperature values based on worst-case ambient temperature. When the measured temperature does not exceed the threshold, the power manager determines the temperature headroom utilizing at least one temperature value based on room ambient temperature. Following, the power manager adjusts the (Continued)

respective operating parameters based on at least the temperature headroom.

20 Claims, 5 Drawing Sheets (51) Int. Cl.
  *G05D 23/30* (2006.01)
  *G06F 1/20* (2006.01)
  *G06F 1/32* (2006.01)
(52) U.S. Cl.
  CPC .......... *G06F 1/3206* (2013.01); *G06F 1/3243* (2013.01); *G06F 1/3296* (2013.01); *Y02B 60/1217* (2013.01); *Y02B 60/1239* (2013.01); *Y02B 60/1275* (2013.01); *Y02B 60/1285* (2013.01)

(56) References Cited

U.S. PATENT DOCUMENTS

| | | | |
|---|---|---|---|
| 6,172,611 B1 | 1/2001 | Hussain et al. | |
| 6,535,798 B1 | 3/2003 | Bhatia et al. | |
| 6,662,136 B2 | 12/2003 | Lamb et al. | |
| 7,064,994 B1 | 6/2006 | Wu | |
| 7,106,696 B1 | 9/2006 | Lim et al. | |
| 7,129,763 B1* | 10/2006 | Bennett | G06F 1/3203 327/262 |
| 7,409,572 B1 | 8/2008 | Hung et al. | |
| 7,426,649 B2 | 9/2008 | Brittain et al. | |
| 7,463,993 B2 | 12/2008 | Finkelstein et al. | |
| 7,552,346 B2 | 6/2009 | Aguilar, Jr. et al. | |
| 7,802,120 B2 | 9/2010 | Conroy et al. | |
| 7,882,369 B1 | 2/2011 | Kelleher et al. | |
| 7,886,164 B1 | 2/2011 | Alben et al. | |
| 8,356,197 B2 | 1/2013 | Allarey et al. | |
| 8,793,512 B2 | 7/2014 | Branover et al. | |
| 8,971,004 B2* | 3/2015 | Roth | G01K 7/16 361/103 |
| 9,122,648 B2 | 9/2015 | Askar et al. | |
| 2002/0087287 A1* | 7/2002 | Dai | G06F 1/206 702/132 |
| 2003/0110423 A1* | 6/2003 | Helms | G06F 1/206 714/100 |
| 2003/0117759 A1 | 6/2003 | Cooper | |
| 2005/0201188 A1* | 9/2005 | Donze | G06F 1/206 365/232 |
| 2005/0289292 A1 | 12/2005 | Morrow et al. | |
| 2006/0161375 A1 | 7/2006 | Duberstein et al. | |
| 2006/0200275 A1* | 9/2006 | Dong | G05D 23/1917 700/300 |
| 2006/0242447 A1 | 10/2006 | Radhakrishnan et al. | |
| 2006/0248355 A1 | 11/2006 | Thayer | |
| 2007/0067136 A1* | 3/2007 | Conroy | G06F 1/206 702/130 |
| 2007/0156370 A1 | 7/2007 | White et al. | |
| 2008/0005592 A1 | 1/2008 | Allarey et al. | |
| 2008/0005603 A1* | 1/2008 | Buch | G06F 1/3287 713/320 |
| 2008/0028244 A1 | 1/2008 | Capps et al. | |
| 2008/0028778 A1* | 2/2008 | Millet | G06F 1/206 62/129 |
| 2008/0168287 A1 | 7/2008 | Berry et al. | |
| 2008/0228959 A1 | 9/2008 | Wang | |
| 2008/0266585 A1 | 10/2008 | Iwata et al. | |
| 2009/0235108 A1 | 9/2009 | Gold et al. | |
| 2009/0296342 A1* | 12/2009 | Matteson | G06F 1/206 361/679.46 |
| 2010/0064162 A1 | 3/2010 | Rotem et al. | |
| 2010/0073068 A1 | 3/2010 | Cho et al. | |
| 2010/0115293 A1 | 5/2010 | Rotem et al. | |
| 2010/0154448 A1* | 6/2010 | Hay | G06F 1/20 62/175 |
| 2011/0022833 A1 | 1/2011 | Nussbaum et al. | |
| 2011/0022857 A1 | 1/2011 | Nussbaum et al. | |
| 2011/0106476 A1* | 5/2011 | Son | G01K 1/20 702/99 |
| 2011/0191602 A1 | 8/2011 | Bearden et al. | |
| 2011/0301777 A1* | 12/2011 | Cox | G06F 1/206 700/299 |
| 2012/0066535 A1 | 3/2012 | Nafziger | |
| 2012/0072749 A1 | 3/2012 | Conroy et al. | |
| 2012/0096288 A1* | 4/2012 | Bates | G06F 1/206 713/320 |
| 2012/0109550 A1 | 5/2012 | Naffziger et al. | |
| 2012/0110352 A1* | 5/2012 | Branover | G06F 1/206 713/300 |
| 2012/0290135 A1* | 11/2012 | Bentivegna | G05D 23/1934 700/276 |
| 2013/0024713 A1 | 1/2013 | Bajic et al. | |
| 2013/0076381 A1* | 3/2013 | Takayanagi | G01K 3/005 324/750.03 |
| 2013/0117590 A1* | 5/2013 | Allen-Ware | G06F 1/206 713/320 |
| 2013/0120930 A1* | 5/2013 | Temkine | G01K 7/01 361/679.47 |
| 2013/0159755 A1 | 6/2013 | Presant et al. | |
| 2013/0246820 A1* | 9/2013 | Branover | G06F 1/3296 713/320 |
| 2014/0103125 A1* | 4/2014 | Wyatt | G11C 5/00 236/1 F |
| 2014/0163765 A1 | 6/2014 | Jain et al. | |
| 2014/0240031 A1* | 8/2014 | Vadakkanmaruveedu | G06F 1/206 327/512 |
| 2014/0371944 A1* | 12/2014 | Vadakkanmaruveedu | G01K 7/16 700/299 |
| 2015/0006937 A1* | 1/2015 | Rotem | G06F 1/206 713/324 |
| 2015/0346798 A1 | 12/2015 | Dongara et al. | |

OTHER PUBLICATIONS

International Search Report and Written Opinion in International Application No. PCT/US2011/057640, mailed Feb. 6, 2012, 12 pages.

International Search Report and Written Opinion in International Application No. PCT/US2008/009102, mailed Dec. 4, 2008, 13 pages.

International Preliminary Report on Patentability in International Application No. PCT/US2008/009102, mailed Jan. 11, 2010, 7 pages.

Non-Final Office Action in U.S. Appl. No. 14/293,520, mailed Mar. 30, 2016, 8 pages.

Final Office Action in U.S. Appl. No. 14/293,520, mailed Sep. 27, 2016, 8 pages.

Notice of Allowance in U.S. Appl. No. 14/293,520, mailed Jan. 12, 2017, 6 pages.

* cited by examiner

HYBRID SYSTEM AND METHOD FOR DETERMINING PERFORMANCE LEVELS BASED ON THERMAL CONDITIONS WITHIN A PROCESSOR

BACKGROUND

Field of the Invention

This invention relates to computing systems, and more particularly, to efficient management of operating modes within a semiconductor chip for optimal power and performance targets.

Description of the Relevant Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for high-performance microprocessors, which may include multiple processor cores, or cores, and multiple pipelines within a core.

A power management unit (PMU) for an IC may disable portions of the IC when it detects or is otherwise informed that the portion is unused for a given period of time. Similarly, power-performance states (P-states) or dynamic voltage and frequency scaling (DVFS) techniques may be adjusted based on usage feedback of one or more processing units. These portions or processing units usually refer to general-purpose processors, graphics processors, and other processing units (although more gross or finer granularities are possible). Algorithms for the adjustments may assume worst-case thermal conditions. However, during typical usage and environment, the worst-case thermal conditions may not actually be met. Lower performance states and scaling may be selected during these times due to the assumptions in the algorithms. Therefore, available performance enhancements are not used. Changes to the algorithms may provide results that are not deterministic.

In view of the above, efficient methods and systems for efficient management of operating modes within an IC for optimal power and performance targets are desired.

SUMMARY OF EMBODIMENTS

Systems and methods for efficient management of operating modes within an IC for optimal power and performance targets are contemplated.

In various embodiments, a semiconductor chip includes one or more processing units each of which operates with respective operating parameters. The operating parameters may include power performance states (P-states) for a given processing unit or dynamic voltage and frequency scaling (DVFS) parameters for multiple processing units. One or more temperature sensors are included to measure a temperature of the one or more processing units during operation.

A power manager on the semiconductor chip determines whether or not the measured temperature exceeds a threshold. In various embodiments, the threshold is a difference between a maximum temperature limit and an under-reporting error of the temperature sensors. The maximum temperature limit may be the worst-case external ambient temperature. When the measured temperature exceeds the threshold, the power manager determines a temperature headroom utilizing temperature values based on worst-case ambient temperature.

When the measured temperature does not exceed the threshold, the power manager determines the temperature headroom utilizing at least one temperature value based on room ambient temperature. The power manager may utilize the maximum temperature limit, a measured ambient temperature and reporting errors of the one or more temperature sensors. Following, the power manager adjusts the respective operating parameters based on at least the temperature headroom.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

It will be appreciated that for simplicity and clarity of illustration, elements shown in the figures have not necessarily been drawn to scale. For example, the dimensions of some of the elements are exaggerated relative to other elements.

Terminology. The following paragraphs provide definitions and/or context for terms found in this disclosure (including the appended claims):

In the detailed description that follows, references to "one embodiment," "an embodiment," "an example embodiment," etc., indicate that the embodiment described includes a particular feature, structure, or characteristic. However, it is to be understood that not every embodiment necessarily includes the particular feature, structure, mode of operation, or characteristic. Moreover, such phrases are not necessarily referring to the same embodiment. Alternate embodiments is devised without departing from the scope of the disclosure, and well-known elements of the disclosure may not be described in detail or is omitted so as not to obscure the relevant details. Further, when a particular feature, structure, or characteristic is described in connection with an embodiment, it is submitted that it is within the knowledge of one skilled in the art to affect such feature, structure, or characteristic in connection with other embodiments whether or not explicitly described. In addition, the description refers to particular embodiments as having particular characteristics or performing particular actions using terms such as "does", "is", "uses", "utilizes", or otherwise. However, it is to be understood that various embodiments do not have the described characteristics or perform the described actions. Rather, alternate embodiments are devised without departing from the scope of the disclosure as noted above.

In addition to the above, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to. As used in the appended claims, these terms do not foreclose additional structure or steps. Consider a claim that recites: "A computing system comprising one or more processor cores . . . ." Such a claim does not foreclose the computing system from including additional components (e.g., a GPU, one or more memory devices).

"Configured To." Various units, circuits, or other components is described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" also includes adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that affect a determination. That is, a determination is solely based on those factors or based, at least in part, on those factors. Consider the phrase "determine A based on B." While B is a factor that affects the determination of A, such a phrase does not foreclose the determination of A from also being based on C. In other instances, A is determined based solely on B.

For semiconductor chips, the thermal design power (TDP) represents a maximum amount of power a cooling system in a computer is able to dissipate. The TDP may also be referred to as a thermal design point. In one example, a cooling system for a laptop processor may be designed for a 20 watt TDP. Therefore, it has been determined that the cooling system is able to dissipate 20 watts without exceeding the maximum junction temperature for transistors within the laptop processor. A power target may be assigned to a semiconductor chip, such as the laptop processor. The power target is a thermal design power value for the die of the semiconductor chip.

Typically, the semiconductor chip is able to dissipate a maximum power, which is larger than the thermal design power (TDP). To prevent failure, the semiconductor chip operates within the TDP value. This TDP value may be used within logic in a power management unit to select one or more operating modes. The power management unit may also be referred to as a power manager. The power manager may be on-chip, but alternatively, the power manager may be located off-chip.

An operational voltage and clock frequency combination may be chosen by the power manager based at least on the TDP value and an estimated power consumption value. This combination of operational voltage and clock frequency may be referred to as a power-performance state (P-state). Alternatively, the semiconductor chip may be a system-on-a-chip (SOC) with multiple processing units, such as general-purpose processing units (CPUs), graphics processing units (GPUs), and other types of processing units. Each of the processing units may have a respective P-state and the power manager utilizes dynamic voltage and frequency scaling (DVFS) techniques for selecting operational parameters for the multiple processing units.

The microarchitecture and circuit-level design techniques for balancing power consumption and performance of the semiconductor chip are aided by efforts to estimate the power consumption of processing units within the semiconductor chip in real-time. Methods for estimating power consumption for the one or more processing units in the semiconductor chip in real-time include measuring an activity level of the processing units.

While running one or more software applications, the real-time estimated power consumption of a processing unit is conveyed to the power manager. The power manager may include one or more units with control logic for balancing reduced power consumption and increased performance for the semiconductor chip. For a given processing unit, the power manager may select one discrete power-performance state (P-state) from several given discrete P-states.

The P-state selected by the power manager may be between a maximum performance state and a minimum power state. The maximum performance state includes a maximum operating clock frequency and the minimum power state includes a minimum operating clock frequency. The intermediate discrete power-performance states (P-states) include given scaled values for a combination of the operating frequency and the operational voltage. An illustration of transitioning between the P-states is provided below.

Figure 1:
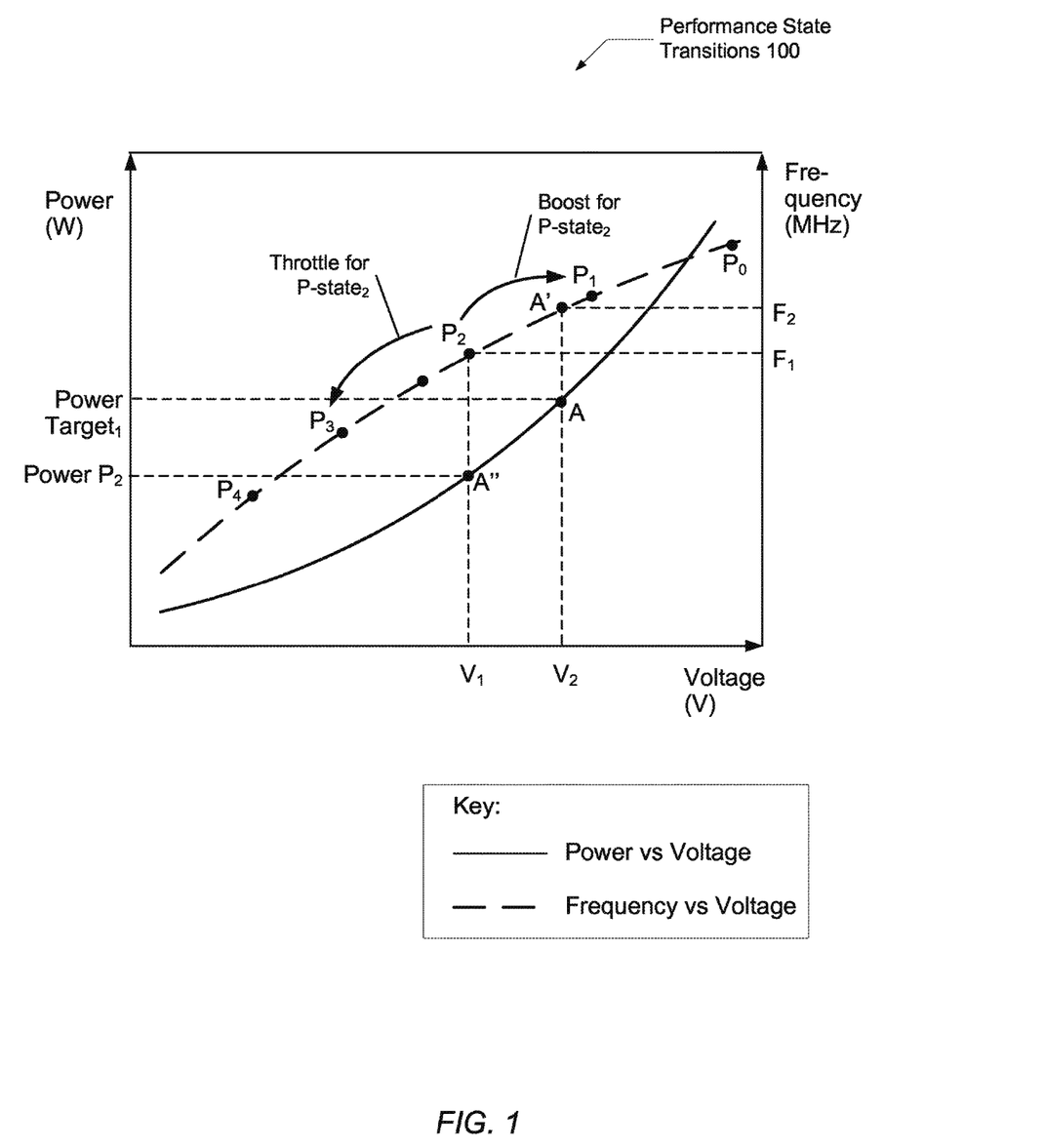
FIG. 1 is a generalized diagram of one embodiment of power-performance state transitions for a semiconductor chip.

Referring to FIG. 1, one embodiment of power-performance state transitions 100 for a semiconductor chip is shown. Two curves are shown in the diagram showing non-linear (e.g., cubic or quadratic) relationships between power versus voltage and frequency versus voltage. Five discrete power-performance states (P-states) are shown in the diagram denoted as P0 to P4. A small number of discrete P-states are shown to simplify the diagram. Although only five discrete P-states are shown, it is well known another number of discrete P-states may be supported.

In the diagram shown, the P-state $P_4$ may correspond to a discrete state with a lowest performance of all the supported discrete states and comprises the lowest operational frequency. In addition, the P-state $P_4$ may correspond to a discrete state with a lowest power consumption of all the supported discrete states and comprises the lowest operational voltage. On the other hand, the P-state $P_0$ may correspond to a discrete state with a highest performance of all the supported discrete states and comprises the highest operational frequency. In addition, the P-state $P_0$ may correspond to a discrete state with a highest power consumption of all the supported discrete states and comprises the highest operational voltage. Typically, the endpoint discrete states represented by P-states $P_0$ and $P_4$ define a region of predictable performance. Therefore, configuring the semiconductor chip to support multiple P-states, or operating points, along the non-linear frequency versus voltage curve may provide stable, optimal utilization of power and delivery of performance for the semiconductor chip, such as a processor. The management of the P-states may conform to an industry standard such as the Advanced Configuration and Power Interface (ACPI) standard, originally developed by Intel Corp., Microsoft Corp., and Toshiba Corp., but development also now includes Hewlett-Packard Corp. and Phoenix Corp. The standard was last published as Revision 5.0a on Nov. 13, 2013.

As shown in the diagram, a power $target_1$ may be chosen for the chip, wherein the power $target_1$ represents the TDP value for the chip. As described earlier, a thermal design power (TDP) may represent an amount of power that a cooling system is able to dissipate without exceeding the maximum junction temperature for transistors within the chip. As shown in FIG. 1, the power $target_1$ corresponds to a data point A on the power versus voltage non-linear curve. Data point A corresponds to an operating voltage $V_2$. Projecting data point A onto the non-linear frequency versus voltage curve with respect to the operating voltage $V_2$ provides data point A'. The data point A' corresponds to an operating frequency $F_2$. The operating point represented by the combination of the operating voltage $V_2$ and the operating frequency $F_2$ may provide an optimal utilization of power and delivery of performance for the chip.

As described above and shown in the diagram, an operating point for power $target_1$ is identified by data point A'. However, this operating point is not represented by a discrete P-state on the power versus frequency curve. The data point A' is located between the P-states $P_1$ and $P_2$. In order to reduce power consumption, the P-state $P_2$ may be chosen as an initial operating point for the corresponding chip. A corresponding combination of the operating voltage $V_1$ and the operating frequency $F_1$ may be the resulting chosen operating point.

A chip, such as a processor, may continue processing workloads utilizing an initially assigned P-state until either (i) the workload significantly changes which causes a significant change in a reported activity level or (ii) a power consumption tracking value reaches a given threshold. For example, if a processor is executing instructions for a workload that causes a consistent activity level over time, the accumulated effect of the workload may cause a power detection system within the processor to reach a given high threshold. This threshold may indicate the processor is generating significant heat and the power should be reduced. In one embodiment, a power manager, which may be located within the processor, may detect this condition and accordingly choose a different P-state corresponding to a lower power-performance operating point.

A "throttle" of a P-state includes decrementing the currently selected P-state by one P-state to a lower power consumption P-state. In contrast, a "boost" of a P-state includes incrementing the currently selected P-state by one P-state to a higher performance P-state. Throttling the P-state $P_2$ includes transitioning the currently selected P-state $P_2$ to the lower power-performance state $P_3$. A simple illustration of boosting and throttling a given P-state, such as the P-state $P_2$ as an example, is shown in FIG. 1. In some embodiments, each boost operation and each throttle operation may cause a currently selected P-state to transition by two or more P-states when the logic supports this added complexity. The P-state transitions may be controlled by logic within a power manager, and thereby is a self-contained system. However, the power manager may also be an external unit.

Figure 2:
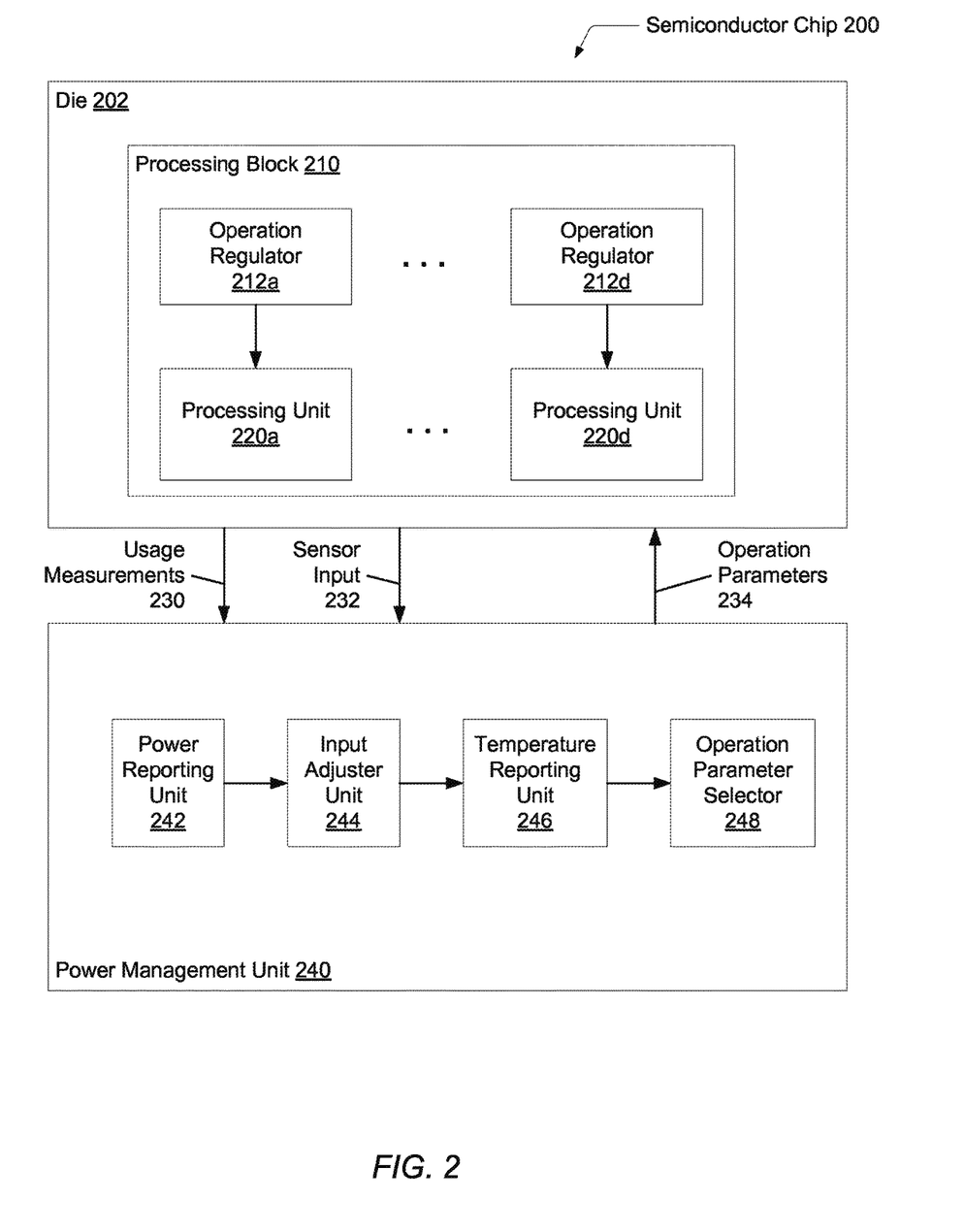
FIG. 2 is a generalized block diagram of one embodiment of a semiconductor chip.

Turning to FIG. 2, one embodiment of a generalized block diagram of a semiconductor chip 200 is shown. Die 202 may comprise a processing block 210 coupled to a power management unit 240. In some embodiments, the power management unit 240 is located on the die 202. In other embodiments, the power management unit 202 is located off-chip as shown. The processing block 210 may comprise processing units 220a-220d. Each one of the processing units 220a-220d may operate on a separate voltage plane. Accordingly, each one of the processing units 220a-220d may be coupled to a separate and respective one of the voltage regulators 212a-212d. Interfaces for die 202 used to communicate with other components such as a memory controller, a network interface card (NIC), peripheral devices, and so forth, are not shown for ease of illustration. Any transistor family may be use to implement die 202. Examples include metal oxide semiconductor field effect transistors (MOSFETs) and bipolar junction transistors (BJTs).

In one embodiment, each one of the processing units 220a-220d may be a processor, such as general-purpose processors, graphics processors, digital signal processing (DSP) cores, special-purpose coprocessors, and so forth. Alternatively, each one of the processing units 220a-220d may be an application specific integrated circuit (ASIC). Each one of the processing units 220a-220d that is a general-purpose processor may include one or more general-purpose cores. Each core may include circuitry for executing instructions according to a predefined instruction set. For example, the x86 instruction set architecture (ISA) may be selected. Alternatively, the x86-64®, ARM®, Alpha®, SPARC®, PowerPC®, MIPS®, PA-RISC®, or any other instruction set architecture may be selected. Generally, processor cores access a cache memory subsystem for data and instructions.

Each one of the processing units 220a-220d that is a graphics processing unit (GPU) typically includes one or more cores with a parallel architecture, such as a single instruction multiple data (SIMD) core. The cores may utilize very wide single instruction multiple data (SIMD) architectures to achieve high throughput in image-rendering applications. The cores may access dedicated storage buffers for data and instructions. The GPU may be a dedicated graphics-rendering device for a personal computer, a workstation, or a video game console.

A power target, such as the thermal design power (TDP), may be assigned to die 202. It has been determined that the cooling system is able to dissipate the TDP value without exceeding the maximum junction temperature for transistors within the processor. In various embodiments, the power management unit 240 may associate a total number of power credits for die 202 to the TDP value for die 202. The power management unit 240 may allocate a separate given number of power credits to each one of the processing units 220a-220d. A sum of the associated power credits equals the total number of power credits for die 202. Designers may determine each of the associated number of power credits for the processing units and the total number of power credits during chip development and testing. The power management unit 240 may be configured to adjust the number of power credits for each one of the processing units 220a-220d over time. These adjustments may be based on a power profile conveyed from each one of the processing units 220a-220d to the power management unit 240.

For example, each one of the processing units 220a-220d may determine a corresponding power consumption number during each given time interval. Any of a variety of techniques may be utilized to determine power consumption of a given one of the processing units 220a-220d.

In some embodiments, one or more of the processing units 220a-220d may sample a number of pre-selected signals. The selection of which signals to sample during a particular clock cycle may correspond to how well the selection correlates to the amount of switching node capacitance within a given one of the processing units 220a-220d. For example, in one embodiment, clock enable signals routed to local clock distribution blocks may be the signals chosen to be sampled and to provide reliable and accurate power usage values.

Sampled data points corresponding to the sampled signals may be taken during each given intermittent cycle. Multiple samples are taken during a sample interval. The determination of the number of intermittent cycles to use may depend on the desired accuracy and confidence of the sampled data. For example, analysis including simulations and/or execution may be used to generate data on power consumption. Based on analysis, a table may be generated using both statistical analysis and measurements of both the real power consumption of an application and estimated power consumption from a sampling. In various embodiments, the table may be programmable (e.g., to adjust weights applicable to signals) in order to account for better estimates or otherwise. A confidence level and an error rate may be chosen to further develop the statistical analysis. Based on such analysis, selected signals may be chosen for sampling during operation.

In various embodiments, existing or additional logic may be added to the design for the purpose of sampling and/or maintaining counts (e.g., using flops) corresponding to these signals. These selected signals may be selected for sampling based upon a determination that they have a relatively significant impact on power consumption. For example, various clock enable signals, bus driver enables, mismatches in content-addressable memories (CAM), and CAM word-line (WL) drivers may be chosen for sampling. In one embodiment, a count may be maintained for such signals during operation (e.g., when a clock enable is asserted). Based on these counts, an estimate of power consumption corresponding to the counts may be determined. For example, a table such as that described above may be used to correlate counts with estimated power consumption. In such an embodiment, the estimated power consumption would not, for example, be based on measures of thermal conditions or current draw. Various examples of power estimation are described in patent application Ser. No. 12/101,598, filed Apr. 11, 2008, entitled "Sampling Chip Activity for Real Time Power Estimation", the entirety of which is incorporated herein by reference.

The processing block 210 may send at least activity level measurements or data, such as the above described count data, to the power management unit 240. These values are shown as usage measurements 230 in FIG. 2. Additionally, the processing block 210 may send sensor measured temperature values to the power management unit 240. These measured temperature values are shown as sensor input 232 in FIG. 2. In various embodiments, the die 202 may utilize analog or digital thermal sensors placed throughout the die 202. The thermal sensors provide information as to when the die heats up in a particular area due to increased compute activity. These sensors respond to each change in thermals, whether it's driven by a compute-related boost in power consumption in one or more of the processing units 220a-220d or by an external environmental factor, such as a rise in ambient temperature. However, when an ambient temperature is not above a threshold, the temperature sensors can detect these scenarios. The resulting information is sent to the power management unit 240.

As used herein, a temperature threshold used to indicate a "worst-case" temperature for the ambient environment may be referred to as the worst-case ambient temperature. The worst-case ambient temperature may also be referred to as the ambient temperature limit. For example, in some embodiments, the worst-case ambient temperature may be 35 degrees Celsius. However, other temperature thresholds may be used and are contemplated. The worst-case ambient temperature may be configurable and updated in a configuration or status register. Alternatively, the worst-case ambient temperature may be a fixed value stored in a register, a read-only memory (ROM), or other storage area. In some embodiments, a tolerance may be used to define a temperature range including the worst-case ambient temperature. The range may include one or more near-worst-case ambient temperature values. One or more of the near-worst-case temperature values in the range may be used in place of the worst-case temperature in calculations described throughout the description.

As shown, the power management unit 240 includes a power reporting unit 242, an input adjuster unit 244, a temperature reporting unit 246 and an operation parameter selector 248. Control logic within the power reporting unit 242 receives the activity levels sampled or measured during a given time interval. The power reporting unit 242 calculates a power value from the usage measurements 230 received from activity monitors in the processing units 220a-220d. The power reporting unit 242 may also calculate a leakage power value to include in a total power value. The leakage power value is dependent on a calculated temperature. The calculated temperature is determined by the temperature reporting unit 246 and utilizes a worst-case ambient temperature value. As described above, the worst-case ambient temperature may be a temperature threshold, or an ambient temperature limit, used to indicate a "worst-case" temperature for the ambient environment. When the sensor-measured temperature is significantly different from the calculated temperature, the calculated power value does not change.

The calculated power value is sent to the temperature reporting unit 246. The temperature reporting unit 246 utilizes both the received calculated power value and input values from the input adjuster unit 244. The input adjuster unit 244 receives the sensor input 232, which is the sensor measured temperature value. In various embodiments, if the sensor measured temperature value exceeds a temperature threshold, then the input adjuster unit 244 does not alter the calculations in the temperature reporting unit 246. The temperature reporting unit 246 receives the calculated power value from the power reporting unit 242 and translates the received value to a calculated die temperature value. The temperature reporting unit 246 may utilize a transient resistor-capacitance (RC) thermal model for the translation. The RC thermal model typically utilizes a worst-case ambient temperature. In some embodiments, the worst-case ambient temperature may be 35 degrees Celsius.

The calculated temperature value is sent to the operation parameter selector 248. Alternatively, a calculated boost value is sent to the operation parameter selector 248. For example, the temperature reporting unit 246 may determine from the calculated power value that the calculated temperature is 98 degrees Celsius. The temperature reporting unit 246 may send the value of 98 degrees Celsius to the operation parameter selector 248. The operation parameter selector 248 may use the received calculated temperature value to determine the boost value, which may be the difference between the maximum temperature limit and the calculated temperature. In this example, when the maximum temperature limit is 100 degrees Celsius, the boost value is (100−98), or 2 degrees Celsius. Alternatively, the temperature reporting unit 246 may calculate and send the boost value to the operation parameter selector 248.

The operation parameter selector 248 receives the calculated temperature value or the boost value, and accordingly selects a set of operation parameters for the processing units 220a-220d based on the received value. The power management unit 240 sends the selected operation parameters 234 to the die 202. In various embodiments, the operation parameters 234 are P-state values. The selection of the operation parameters may dynamically modulate the operational voltage and operational clock frequency combination to vary power consumption of the die 202 such that the calculated power value causes the calculated temperature value to reach a maximum temperature value in the next time interval. Therefore, a feedback loop is created among the unit 248, processing units 220a-220d, and the unit 242. As described earlier, the maximum temperature value may be based on the TDP and the transistor junction breakdown temperature for the die 202. In some embodiments, the maximum temperature value is 100 degrees Celsius.

The translation of the calculated power value to the calculated temperature value utilizes the worst-case ambient temperature. Therefore, the temperature reporting unit 246 conservatively uses the assumption that the die 202 continually operates under worst-case temperature conditions, such as the worst-case ambient temperature. However, under thermal conditions with room ambient temperature, such as 23 degrees Celsius, the actual temperature of die 202 may significantly be different from each of the calculated temperature and the maximum temperature limit. For example, the difference between the worst-case ambient temperature of 35 degrees Celsius and room ambient temperature of 23 degrees Celsius is 12 degrees Celsius. The difference of 12 degrees Celsius may not be used for boosting P-states under the approach of using conservative worst-case calculations. Therefore, the feedback loop and the adjustment of the operation parameters do not increase performance of die 202 as available under the room ambient temperature condition. However, the measured sensor temperature may be used to adjust the conservative worst-case approach and access the additional available performance gains.

As described earlier, the processing block 210 may send sensor measured temperature values to the power management unit 240. These measured temperature values are shown as sensor input 232 in FIG. 2. The die 202 may utilize analog or digital thermal sensors placed throughout the die 202. The thermal sensors provide information as to when the die heats up in a particular area due to increased compute activity by one or more of the processing units 220a-220d or by an external environmental factor, such as a rise in ambient temperature. However, when worst-case ambient temperature conditions are not a factor, the temperature sensors can also detect these scenarios.

The input adjuster unit 244 receives the sensor input 232, which is the sensor measured temperature value. The accuracy of the on-die temperature sensors may influence the available temperature margin used for extra boosting of the operation parameters. The high temperature reporting sensors have an over-reporting error. Similarly, the low temperature reporting sensors have an under-reporting error. For example, these errors may have a magnitude of 4 degrees Celsius.

In various embodiments, the sensor measured temperature value sent to the input adjuster unit 244 is compared to a temperature threshold. In some embodiments, the temperature threshold is a difference between the maximum temperature limit and the magnitude of the under-reporting error of the temperature sensors. Again, the maximum temperature value may be based on the TDP and the transistor junction breakdown temperature for the die 202. In some embodiments, the maximum temperature value is 100 degrees Celsius. If the magnitude for under-reporting error for the on-die temperature sensors is 4 degrees Celsius, then the temperature threshold for this example is (100−4), or 96 degrees Celsius. Additionally, other formulas and values for the temperature threshold are possible and contemplated.

In various embodiments, if the sensor measured temperature value sent to the input adjuster unit 244 is less than a temperature threshold, then the input adjuster unit 244 alters the calculations in the temperature reporting unit 246. The input adjuster unit 244 may alter the calculations in the temperature reporting unit 246 in multiple ways. In some embodiments, the input adjuster unit 244 may indicate to the temperature reporting unit 246 that an extra margin is to be added to a calculated boost value. In some embodiments, the extra margin is a difference between (i) a difference between the worst-case ambient temperature and the room ambient temperature and (ii) a sum of the magnitudes of the temperature sensor over-reporting error and the under-reporting error. For example, with the values used earlier, the extra margin would be (35−23)−(4+4), or 12−8, or 4 degrees Celsius. The extra margin of 4 degrees Celsius would be added to the original boost value. For example, if the temperature threshold is 96 degrees Celsius and the calculated temperature is 94 degrees Celsius, then the extra boost value of 4 degrees Celsius would be added to the original boost value of (100−94), or 6 degrees Celsius for a total boost value of (6+4), or 10 degrees Celsius. The total boost value of 10 degrees Celsius is sent to the operation parameter selector 248.

As described earlier, the input adjuster unit 244 may alter the calculations in the temperature reporting unit 246 in multiple ways. One adjustment is calculating an extra boost value as described in the above description. In addition, in other embodiments, the input adjuster unit 244 may indicate to the temperature reporting unit 246 to utilize a different temperature than the worst-case ambient temperature in the transient RC thermal model used for translating the calculated power to the calculated die temperature. For example, the worst-case ambient temperature may be replaced or scaled according to the received sensor measured temperature. Additionally, the over-reporting and under-reporting sensor errors may be used for scaling.

Further, another adjustment that may be used is replacing or scaling the RC coefficients used in the transient RC thermal model. Again, the received sensor measured temperature and the over-reporting and under-reporting sensor errors may be used for scaling. Further still, the input adjuster unit 244 may replace or scale the calculated power value based on the received sensor measured temperature and the over-reporting and under-reporting sensor errors.

Figure 3:
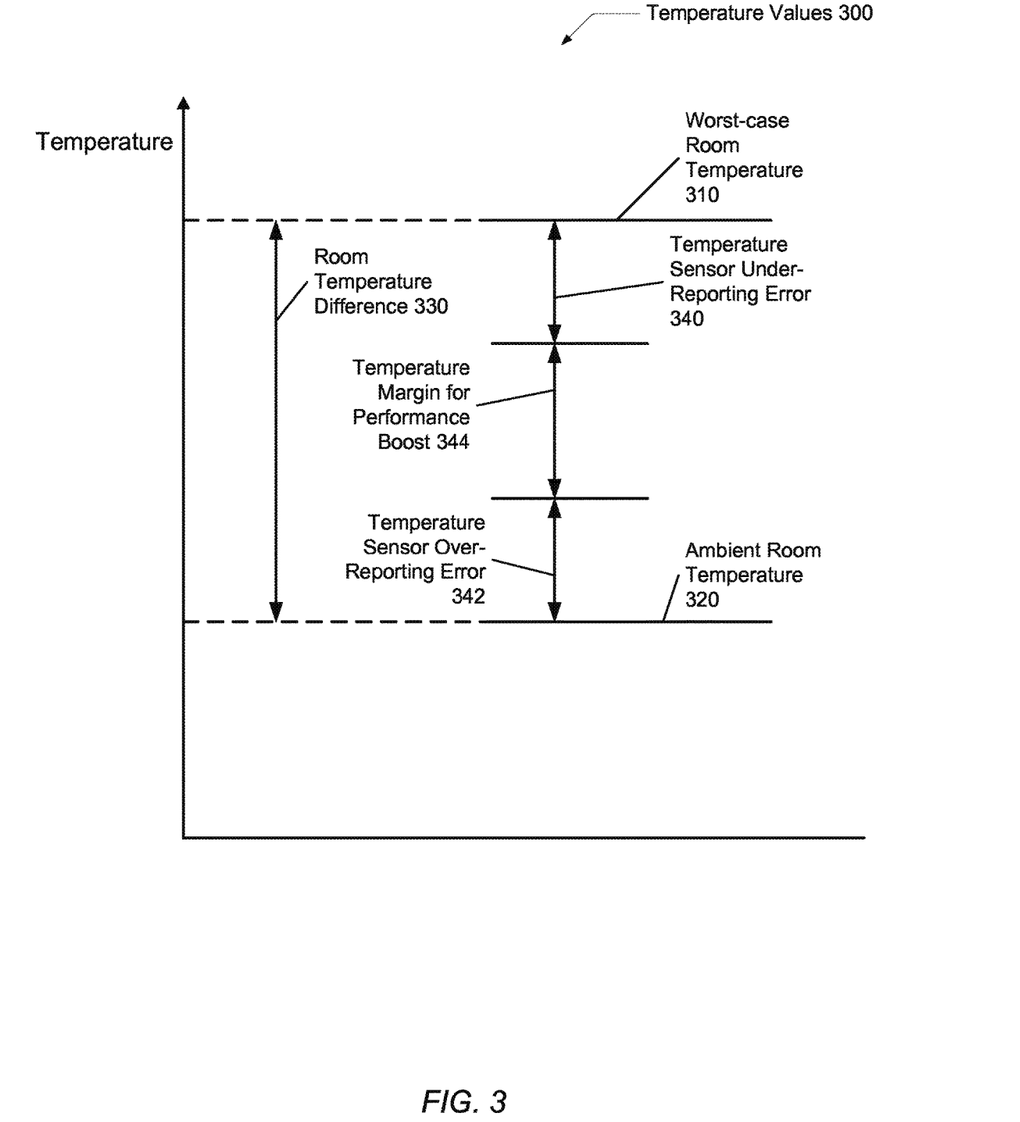
FIG. 3 is a generalized diagram of one embodiment of temperature values indicating sensor temperature accuracy.

Turning now to FIG. 3, one embodiment is shown of temperature values 300 indicating sensor temperature accuracy. As shown, a worst-case room temperature 310 may have an appreciable difference 330 with room ambient temperature 320. The room temperature difference 330 may be used for extra boosting of operation parameters of one or more processing units. However, the on-die temperature sensors used to determine whether to use the extra boosting include reporting errors.

The accuracy of the temperature sensors influences the available amount of extra boosting used for selecting the operation parameters. An under-reporting error 340 of low temperature reporting sensors reduces the available amount of extra boosting from the room temperature difference 330. Additionally, an over-reporting error 342 of high temperature reporting sensors reduces the available amount of extra boosting from the room temperature difference 330. The remaining available amount of extra boosting from the room temperature difference 330 is shown as the margin for performance boost 344.

Figure 4:
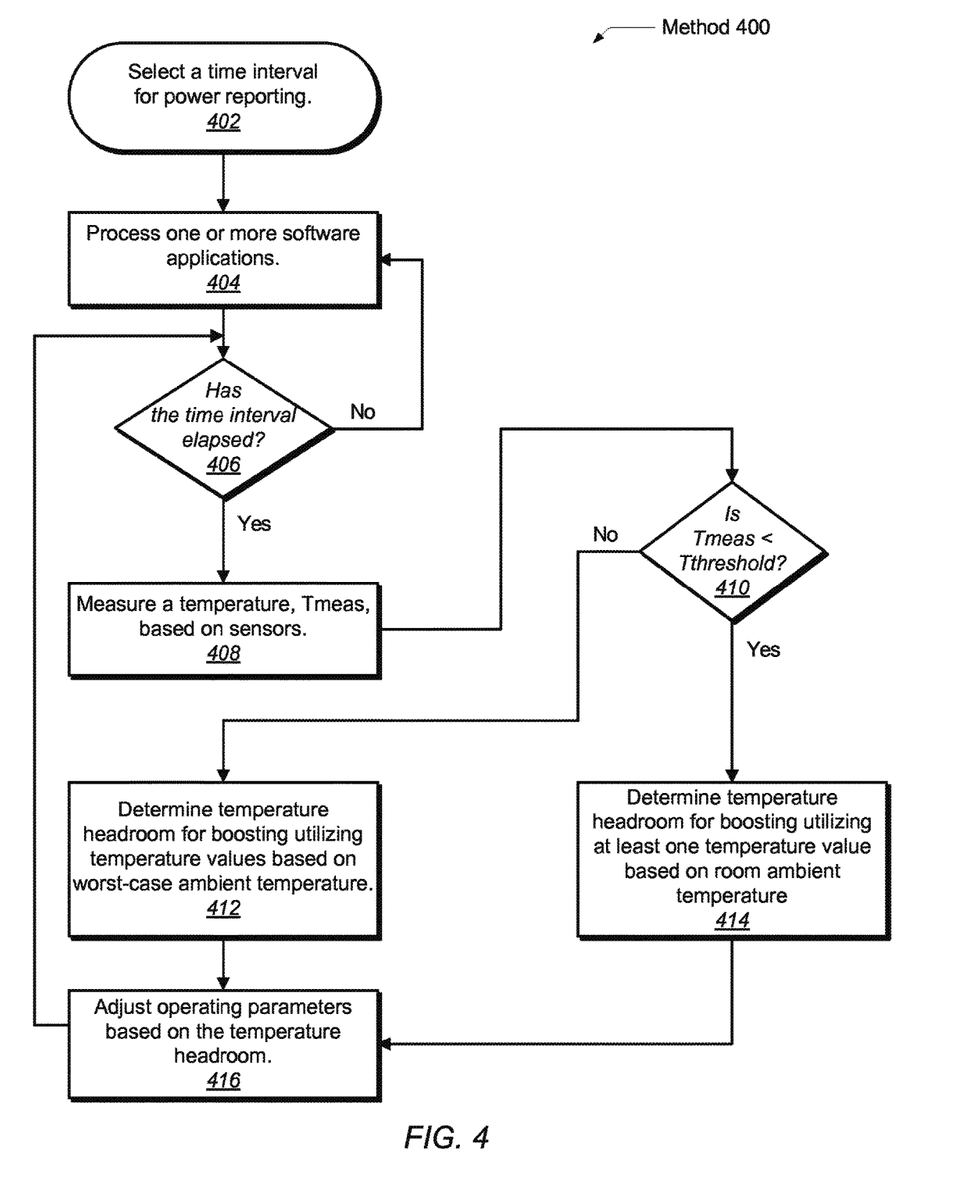
FIG. 4 is a generalized flow diagram of one embodiment of a method for boosting performance when worst-case temperature conditions are not present.

Referring now to FIG. 4, one embodiment of a method 400 for boosting performance when worst-case temperature conditions are not present is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 402, a semiconductor chip may receive requested time interval(s) for power reporting from an external agent, such as the operating system or another chip or computation unit. Alternatively, the semiconductor chip may have the time interval for power reporting stored in configuration and status registers, in BIOS, or in firmware. In block 404, the semiconductor chip loads and processes instructions of one or more software applications. In some embodiments, the semiconductor chip may have been processing applications before receiving values for the time interval. Control logic within the semiconductor chip may sample a number of pre-selected signals. The selection of which signals to sample during a particular clock cycle may correspond to how well the selection correlates to the amount of switching node capacitance within a given one of one or more processing units on the semiconductor chip.

If the time interval has elapsed (conditional block 406), then in block 408, one or more on-die temperature sensors provide temperature measurements to read. The measurements may be combined into a single value, such as an average value. The measured temperature is compared to a temperature threshold. In some embodiments, the temperature threshold is a difference of a maximum temperature limit and an under-reporting sensor error. However, other values for the threshold are possible and contemplated.

If the measured temperature exceeds the threshold (conditional block 410), then in block 412, the temperature headroom for boosting is determined utilizing temperature values based on worst-case ambient temperature. As described earlier, a power value may be calculated from reported activity levels based on sampling selected signals. A transient RC thermal model may be used to translate the calculated power value to a calculated temperature value. The RC thermal model typically utilizes a worst-case ambient temperature. A difference between the maximum temperature limit and the calculated temperature value may be used as temperature headroom for boosting.

If the measured temperature does not exceed the threshold (conditional block 410), then in block 414, the temperature headroom for boosting is determined by utilizing at least one temperature value based on room ambient temperature. As described earlier, in some embodiments, an extra margin is added to a calculated boost value. The extra margin may be a difference between (i) a difference between the worst-case ambient temperature and the room ambient temperature and (ii) a sum of the magnitudes of the temperature sensor over-reporting error and the under-reporting error. For example, with the values used earlier, the extra margin would be (35−23)−(4+4), or 12−8, or 4 degrees Celsius. The extra margin of 4 degrees Celsius would be added to the original boost value. The original boost value may be the difference between the maximum temperature limit and the calculated temperature value. The sum would be the temperature headroom.

In other embodiments, determining the temperature headroom for boosting utilizes a different temperature than the worst-case ambient temperature in the transient RC thermal model used for translating the calculated power to the calculated die temperature. For example, the worst-case ambient temperature may be replaced or scaled according to the received sensor measured temperature and the over-reporting and under-reporting sensor errors. In yet other embodiments, determining the temperature headroom for boosting includes replacing or scaling the RC coefficients used in the transient RC thermal model or the calculated power value. Again, the received sensor measured temperature and the over-reporting and under-reporting sensor errors may be used for scaling. In block 416, the operating parameters of one or more processing units are adjusted based on the temperature headroom.

Figure 5:
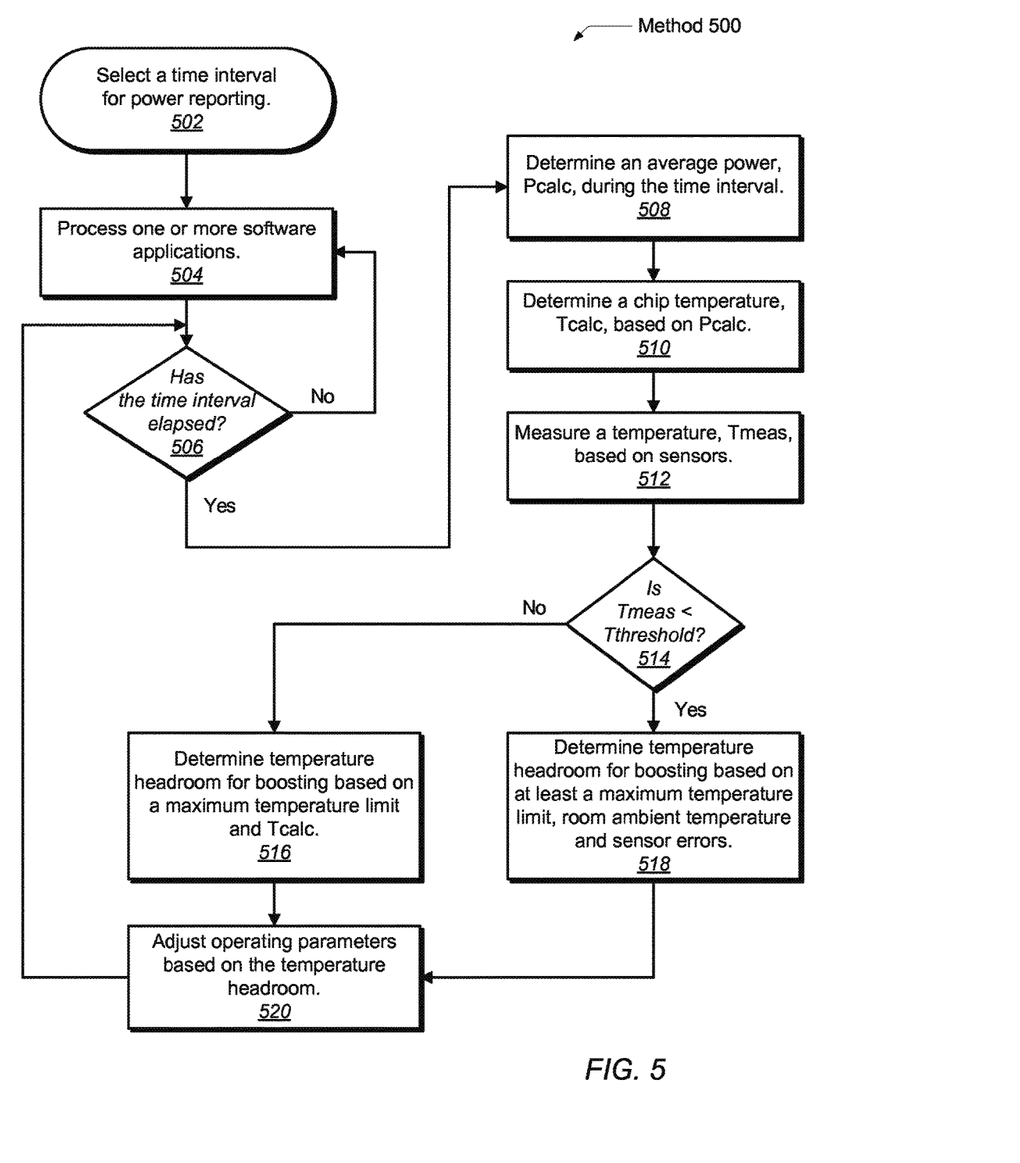
FIG. 5 is a generalized flow diagram of another embodiment of a method for boosting performance when worst-case temperature conditions are not present.

Referring now to FIG. 5, another embodiment of a method 500 for boosting performance when worst-case temperature conditions are not present is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a time interval is selected for power reporting on a semiconductor chip. Methods described earlier may be used for the selection. In block 504, the semiconductor chip loads and processes instructions of one or more software applications. Control logic within the semiconductor chip may sample a number of pre-selected signals during a particular clock cycle. The selected signals may correlate to the amount of switching node capacitance within a given one of one or more processing units on the semiconductor chip.

If the time interval has elapsed (conditional block 506), then in block 508, a power value is calculated from reported activity levels that are based on sampling selected signals. In addition, a leakage power value may also be calculated. The power value and the leakage power value are summed to provide a total calculated power value, Pcalc. The leakage power value is dependent on a calculated temperature. The calculated temperature is determined by control logic utilizing a worst-case ambient temperature value. Therefore, when the actual ambient temperature is significantly different from the worst-case ambient temperature, the calculated power value, Pcalc, does not change.

In block 510, a transient RC thermal model is used to translate the calculated power value, Pcalc, to a calculated temperature value, Tcalc. The RC thermal model utilizes a worst-case ambient temperature. In block 512, one or more on-die temperature sensors provide temperature measurements to read. The measurements may be combined into a single value, such as an average value. The measured temperature, Tmeas, is compared to a temperature threshold. In some embodiments, the temperature threshold is a difference of the maximum temperature limit, Tmax, and an under-reporting sensor error, Tunder-reporting. Using values in earlier examples, Tmax is 100 degrees Celsius and the magnitude of Tunder-reporting is 4 degrees Celsius. Therefore, the threshold is (Tmax−Tunder-reporting), or (100−4), which is 96 degrees Celsius. However, other expressions for the threshold are also possible and contemplated.

If the measured temperature, Tmeas, exceeds the threshold (conditional block 514), then in block 516, the temperature headroom for boosting is determined by the difference between the maximum temperature limit, Tmax, and the calculated temperature value, Tcalc, or (Tmax−Tcalc). Using values in earlier examples, Tmax is 100 degrees Celsius and the threshold is 96 degrees Celsius. The value Tmeas may be 98 degrees Celsius and exceeds the threshold of 96 degrees Celsius. Therefore, the temperature headroom is (Tmax−Tcalc). The calculated temperature may be at Tmax or very close, which does not provide a significant temperature headroom for boosting.

If the measured temperature, Tmeas, does not exceed the threshold (conditional block 514), then in block 518, the temperature headroom for boosting is based on at least a maximum temperature limit, Tmax; room ambient temperature, Troom-ambient; and the on-die sensor errors. The temperature headroom may be represented by the expression:

Tmax−(Tcalc−Textra-margin)=(Tmax−Tcalc)+Textra-margin

The value Textra-margin may be represented by the expression:

(Tworst-case-ambient−Troom-ambient)−Tunder-reporting−Tover-reporting=(Tworst-case-ambient−Troom-ambient)−(|Tunder-reporting|+|Tover-reporting|)

Using the values of earlier examples, Tmax is 100 degrees Celsius and the threshold is 96 degrees Celsius. The value Tmeas may be 94 degrees Celsius and does not exceed the threshold of 96 degrees Celsius. Therefore, the temperature headroom is (Tmax−Tcalc)+Textra-margin, wherein the value Textra-margin is (35−23)−(4+4)=12−8=4 degrees Celsius. The temperature headroom becomes (100−94)+4=10 degrees Celsius. In block 520, the operating parameters of one or more processing units are adjusted based on the temperature headroom and possibly on the allocation of power credits.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor chip comprising:
   one or more processing units, each operating with respective operating parameters;
   one or more temperature sensors configured to determine a measured temperature of the operating one or more processing units; and
   a power manager configured to:
   in response to determining the measured temperature exceeds a threshold that is below a maximum temperature limit, determine a temperature headroom by calculating a temperature value for the one or more processing units based on an ambient temperature limit;

in response to determining the measured temperature does not exceed the threshold, determine the temperature headroom by calculating a temperature value for the one or more processing units based on a measured room ambient temperature; and adjust the respective operating parameters based on the temperature headroom, wherein the temperature headroom is determined based at least in part on a difference between the calculated temperature value and the maximum temperature limit.

2. The semiconductor chip as recited in claim 1, wherein in response to determining the measured temperature does not exceed the threshold, the power manager is further configured to determine the temperature headroom by determining at least a first difference between the ambient temperature limit and the measured room ambient temperature.

3. The semiconductor chip as recited in claim 2, wherein in response to determining the measured temperature does not exceed the threshold, the power manager is further configured to determine the temperature headroom by summing the first difference with a second difference between a maximum temperature limit and a calculated temperature.

4. The semiconductor chip as recited in claim 3, wherein the power manager is further configured to determine the temperature headroom by determining a third difference between (i) the sum of the first difference and the second difference and (ii) a sum of an under-reporting error and an over-reporting error of the one or more temperature sensors.

5. The semiconductor chip as recited in claim 3, wherein the maximum temperature limit is based on a maximum die junction temperature and the calculated temperature is based on the ambient temperature limit and activity levels of the one or more processing units, wherein the ambient temperature limit is a threshold indicating a worst-case ambient temperature.

6. The semiconductor chip as recited in claim 3, wherein the threshold is a fourth difference between the maximum temperature limit and an under-reporting error.

7. The semiconductor chip as recited in claim 3, wherein the operating parameters comprise power performance states (P-states).

8. The semiconductor chip as recited in claim 2, wherein in response to determining the measured temperature does not exceed the threshold, the power manager is further configured to determine a calculated temperature based on an average power consumption of the one or more processing units during a given time interval and the first difference.

9. The semiconductor chip as recited in claim 2, wherein in response to determining the measured temperature does not exceed the threshold, the power manager is further configured to determine a calculated temperature based on an average power consumption of the one or more processing units during a given time interval and resistor-capacitance (RC) coefficients adjusted by the first difference.

10. A method comprising:
determining a measured temperature of one or more operating processing units by utilizing one or more temperature sensors, wherein each of the one or more processing units operates with respective operating parameters;
in response to determining the measured temperature exceeds a threshold that is below a maximum temperature limit, determining a temperature headroom by calculating a temperature value for the one or more processing units based on an ambient temperature limit;
in response to determining the measured temperature does not exceed the threshold, determining the temperature headroom by calculating a temperature value for the one or more processing units based on a measured room ambient temperature; and
adjusting the respective operating parameters based on at least the temperature headroom, wherein the temperature headroom is determined based at least in part on a difference between the calculated temperature value and the maximum temperature limit.

11. The method as recited in claim 10, wherein in response to determining the measured temperature does not exceed the threshold, the method further comprises determining the temperature headroom by determining at least a first difference between the ambient temperature limit and the measured room ambient temperature.

12. The method as recited in claim 11, wherein in response to determining the measured temperature does not exceed the threshold, the method further comprises determining the temperature headroom by summing the first difference with a second difference between a maximum temperature limit and a calculated temperature.

13. The method as recited in claim 12, wherein the method further comprises determining the temperature headroom by determining a third difference between (i) the sum of the first difference and the second difference and (ii) a sum of an under-reporting error and an over-reporting error of the one or more temperature sensors.

14. The method as recited in claim 12, wherein the maximum temperature limit is based on a maximum die junction temperature and the calculated temperature is based on the ambient temperature limit and activity levels of the one or more processing units, wherein the ambient temperature limit is a threshold indicating a worst-case ambient temperature.

15. The method as recited in claim 12, wherein the threshold is a fourth difference between the maximum temperature limit and an under-reporting error.

16. The method as recited in claim 11, wherein in response to determining the measured temperature does not exceed the threshold, the method further comprises determining a calculated temperature based on an average power consumption of the one or more processing units during a given time interval and the first difference.

17. An on-die power management system comprising:
an input adjuster unit; and
an operation parameter selector; and
wherein the input adjuster unit is configured to:
receive a measured temperature of one or more operating processing units determined by one or more temperature sensors, wherein each of the one or more processing units operates with respective operating parameters;
in response to determining the measured temperature exceeds a threshold that is below a maximum temperature limit, determine a temperature headroom by calculating a temperature value for the one or more processing units based on an ambient temperature limit;
in response to determining the measured temperature does not exceed the threshold, determine the temperature headroom by calculating a temperature value for the one or more processing units based on a measured room ambient temperature; and
wherein the operation parameter selector is configured to:
adjust the respective operating parameters based on at least the temperature headroom, wherein the temperature headroom is determined based at least in part on a difference between the calculated temperature value and the maximum temperature limit; and
convey the adjusted operating parameters to the one or more processing units.

18. The power management system as recited in claim 17, wherein in response to determining the measured temperature does not exceed the threshold, the input adjuster unit is further configured to determine the temperature headroom by determining at least a first difference between the ambient temperature limit and the measured room ambient temperature.

19. The power management system as recited in claim 18, wherein in response to determining the measured temperature does not exceed the threshold, the input adjuster unit is further configured to determine the temperature headroom by summing the first difference with a second difference between a maximum temperature limit and a calculated temperature.

20. The power management system as recited in claim 19, wherein the input adjuster unit is further configured to determine the temperature headroom by determining a third difference between (i) the sum of the first difference and the second difference and (ii) a sum of an under-reporting error and an over-reporting error of the one or more temperature sensors.

* * * * *